No. 636,432. Patented Nov. 7, 1899.
E. L. HORNEY.
COPY BOOK.
(Application filed Feb. 21, 1899.)
(No Model.)
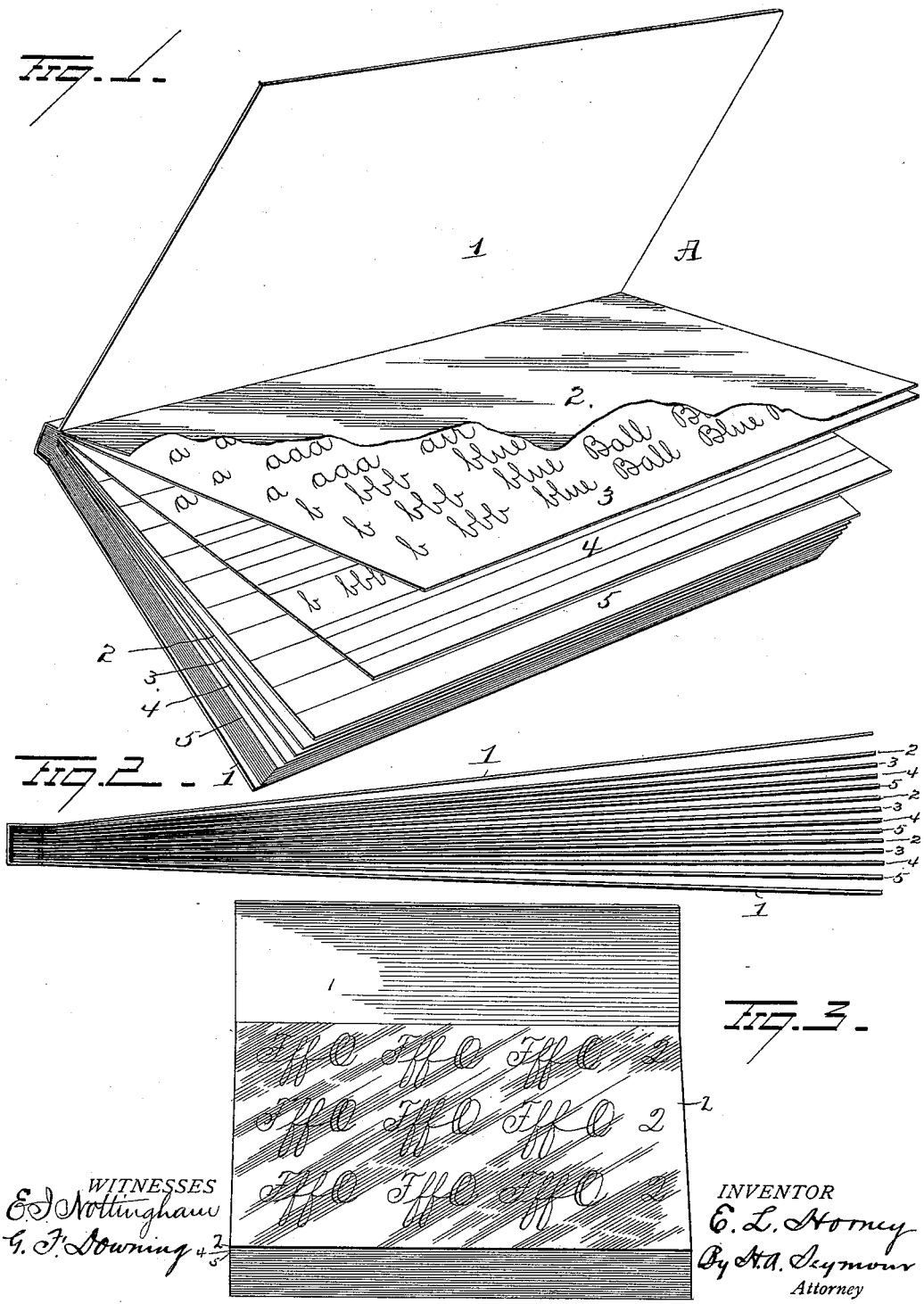

UNITED STATES PATENT OFFICE.

EDWARD LEWIS HORNEY, OF CHILLICOTHE, OHIO.

COPY-BOOK.

SPECIFICATION forming part of Letters Patent No. 636,432, dated November 7, 1899.

Application filed February 21, 1899. Serial No. 706,356. (No model.)

*To all whom it may concern:*

Be it known that I, EDWARD LEWIS HORNEY, of Chillicothe, in the county of Ross and State of Ohio, have invented certain new and useful Improvements in Copy-Books; and I do hereby declare the following to be a full, clear, and exact description of the invention, such as will enable others skilled in the art to which it appertains to make and use the same.
My invention relates to an improvement in copy-books and practice-pads, the object being to so arrange a copy-book or practice-pad as to insure the exact and accurate formation of letters and words by the pupil.
A further object is to provide a copy-book or practice-pad wherein the pupil will be enabled to first be so guided as to produce a facsimile of letters and words, then to reproduce letters and words from a copy and without an absolute guide, and then to reproduce said letters and words without either copy or guide.

With these ends in view my invention consists in certain novel features of construction and combinations of parts, as will be hereinafter more fully described, and pointed out in the claims.

In the accompanying drawings, Figure 1 represents a view illustrating my improvement. Fig. 2 is a view in section of the same, and Fig. 3 is a view of a modification.

A represents my improved copy-book or practice-pad, and it comprises a cover 1, a series of sheets or pages of tracing material 2, a series of unlined pages or leaves 3, having characters, letters, words, and figures printed or engraved thereon, a series of pages or leaves 4, suitably lined and having characters, letters, words, and figures printed or engraved thereon within the large spaces formed between said lines, and a series of pages or leaves 5, having lines thereon. The pages or leaves are so arranged in the book or pad that one of each series follows in the order above described. By thus arranging the several series of leaves a pupil will be, first, enabled by means of the tracing material 2, which rests upon page or leaf 3, to reproduce an exact facsimile of the characters, letters, words, and figures contained on said page or leaf 3 by tracing the same; secondly, the pupil will then be enabled to reproduce on the blank lines of the following page or leaf the same characters, letters, words, and figures, but from a copy printed or engraved on said page, and, thirdly, the pupil will also be enabled to reproduce from memory and on the lines of the blank page 5 the aforesaid characters, letters, words, and figures.

Instead of printing or engraving the set forms on the leaves 3 said set forms may be printed or otherwise formed on the backs or reverse faces of the tracing material, as shown in Fig. 3, and thus dispense with the leaves 3.

In the public schools and other similar institutions writing is taught by what is commonly known as the "sight and word system," which consists, substantially, in teaching the pupil to write by the appearance rather than by the spelling of the words. This system entails considerable labor on the teacher in the preparation of forms for each pupil under his or her charge and consumes considerable time that might be otherwise employed, while with my system the labor of preparing forms for each pupil is avoided and the attending labor dispensed with, and at the same time more accurate results can be obtained through the medium of first tracing an exact facsimile of the matter to be copied.

While my improved system is specially designed for copy-books, it is evident that the pages or leaves may be arranged in tablet form and the said leaves or pages adapted to be torn off and presented to the teacher for examination when filled by the pupil; but in any case the various series of leaves are bound together.

Having fully described my invention, what I claim as new, and desire to secure by Letters Patent, is—

1. A copy-book or pad consisting of several series of leaves bound together, a leaf of each series of leaves having set forms thereon, another leaf of each series having blank lines, another leaf of each series having set forms and blank lines one leaf of each series made of transparent material to permit the set forms to be traced on the exposed face thereof.

2. A copy-book or pad, comprising several sets of leaves bound together successively, each set of leaves comprising one having letters, words or characters thereon; another leaf of each series being made of tracing material and disposed in advance of the leaf having letters, words or characters; a third leaf having letters, words or characters thereon and also having blank lines, and the fourth leaf of each set having blank lines and without letters, words or characters.

3. A copy-book or pad comprising a cover, a series of leaves having guiding-forms thereon, two leaves having blank lines and set forms and blank lines respectively alternating with the first-mentioned leaves throughout the book or pad and sheets of tracing material located throughout the book or pad and disposed over the leaves having the guiding-forms thereon, said cover and leaves being bound together.

In testimony whereof I have signed this specification in the presence of two subscribing witnesses.

EDWARD LEWIS HORNEY.

Witnesses:
   EDWARD OBERER,
   SHERMAN T. LEMLEY.